US012335256B2

(12) United States Patent
Rule et al.

(10) Patent No.: US 12,335,256 B2
(45) Date of Patent: Jun. 17, 2025

(54) SYSTEMS AND METHODS FOR DEVICE BINDING AUTHENTICATION

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 193 days.

(21) Appl. No.: 18/118,987

(22) Filed: Mar. 8, 2023

(65) Prior Publication Data

US 2024/0305626 A1  Sep. 12, 2024

(51) Int. Cl.
*H04L 9/40* (2022.01)
(52) U.S. Cl.
CPC .............................. *H04L 63/0838* (2013.01)
(58) Field of Classification Search
CPC ............. H04L 63/0838; H04L 63/0853; H04L 2463/082
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

A Study Oon Multifactor Authentication Model Using Fingerprint Hash Code, Password and OTP, by Aithal et al., published 2018. (Year: 2018).*

(Continued)

*Primary Examiner* — Vu V Tran
(74) *Attorney, Agent, or Firm* — KDW Firm PLLC; Andrew D. Kasnevich

(57) ABSTRACT

The proposed system and method is directed at a system for generating a GPU-based mobile device signature to enhance the strength of a OTP card authentication signal. The proposed implementation leverages the NFC read capability of contactless OTP cards and WebGL image rendering functionality of mobile browser. An image, or a URL pointing to one, is received, via NFC transmission from a contactless card, for processing by a mobile browser. The output of the mobile browser image processing buffer (WebGL can then be hashed and used as a device identifier for the specific mobile device performing electronic authentication of a transmission source (Read by verifying, with high degree of certainty, the identity of the reading mobile device.

20 Claims, 9 Drawing Sheets

(56) References Cited

U.S. PATENT DOCUMENTS

| | | |
|---|---|---|
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |

(56) References Cited

U.S. PATENT DOCUMENTS

| | | | |
|---|---|---|---|
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,885,410 B1* | 1/2021 | Rule ............... G06Q 20/3276 |
| 11,551,200 B1 | 1/2023 | Cook et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |

(56) References Cited

U.S. PATENT DOCUMENTS

| | | |
|---|---|---|
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0038087 A1* | 2/2015 | Park ................... H04W 4/80 455/41.3 |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |

(56) References Cited

U.S. PATENT DOCUMENTS

| | | |
|---|---|---|
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2022/0237608 A1 | 7/2022 | Rule et al. |
| 2022/0247741 A1 | 8/2022 | Moreton et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016

(56) References Cited

OTHER PUBLICATIONS

[retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared- : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card User Authentication for Contactless Smart Cards based on Gesture Recognition", LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
The International Search Report and Written Opinion dated Jul. 3, 2024, for related Int. App. No. PCT/US24/18823 (11 pages).
Laor et al., "DrawnApart: A Device Identification Technique based on Remote GPU Fingerprinting", arVix Jan. 24, 2022; https://arxiv.org/abs/2201.09956.

\* cited by examiner

SYSTEMS AND METHODS FOR DEVICE BINDING AUTHENTICATION

FIELD OF THE DISCLOSURE

The present disclosure is generally related to secure electronic authentication, and more specifically to a graphics processing unit based device signature generation for providing a user device authentication.

BACKGROUND

As device manufactures continue to restrict access to information specific to a device configuration and operation, it has become increasingly difficult to generate unique device identifiers that may be persistently associated with a particular device initiating a secure electronic transaction. These unique features can be used to validate a device in consecutive authentication transactions. Blocking of access to device-specific data impedes the integration of device fingerprint data, for reliable identification of a source device as a verification factor, in user authentication systems and processes thus hampering efforts for enhancing access verification security by associating a device to previous authentication transactions for a specific user.

These and other deficiencies exist Therefore, there exists a need for a device signature and/or fingerprint computation system and process that is both accessible and can be readily integrated into a user authentication process.

SUMMARY OF THE DISCLOSURE

Embodiments of the present disclosure provide a system, method, and non-transitory computer-accessible medium having stored thereon computer-executable instructions for implementing a device binding authentication system and process. In some aspects, the techniques described herein relate to a method for enhancing one time password (OTP) card authentication based on computation of a digital signature associated with operation of a graphics processing unit (GPU) of a mobile and/or computing device and providing the computed GPU-based device fingerprint as authentication data for validating a transaction-initiating source device and/or a transacting user's identity. The method includes: receiving an authentication message, via a near field communication (NFC) transmission, by a mobile device from a contactless card, the authentication message, corresponding to a user authentication request, being operative to provide raw image data associated with an image, to a mobile browser running on the mobile device; rendering, by the mobile browser, the image associated with raw image data, using a web graphics library (WebGL) application programming interface (API); generating an image hash identifier from rendered image data generated by the mobile browser using the WebGL API, the image hash identifier corresponding to the user authentication request; mapping the image hash identifier with a graphics processing unit (GPU) associated with the mobile device, for binding the mobile device to the authentication message provided by the NFC transmission from the contactless card; comparing, by an authentication server, the image hash identifier received from the mobile device, to one or more previously stored hash identifiers associated with one or more previous user authentication requests; verifying, by the authentication server, the mobile device based on determining a match between the image hash identifier received from the mobile device in response to the user authentication request, and the one or more previously stored hash identifiers associated with the one or more previous user authentication request.

In some aspects, the techniques described herein relate to a method, wherein the authentication message include a uniform resource locator (URL) pointing to the image, the image being hosted on a web server, and the mobile device, responsive to receiving the URL, being operative to retrieve raw image data from the web server. The raw image data associated with the image may be retrieved from the web server through a URL redirection. In some embodiments, the URL may include embedded instructions for redirecting to multiple images to be periodically rotated, the multiple images being stored on the web server. Alternatively, the multiple images may be stored on one or more distinct web servers.

In some aspects, the techniques described herein relate to a method, wherein raw image data is stored in an near field communication data exchange format (NDEF) file on the contactless card, the NDEF file further including an image identifier corresponding to a multipurpose internet mail extensions (MIME) media type of the image for facilitating the rendering of the image by the mobile browser having a web graphics library (WebGL) application programming interface (API). The NDEF file may be directly transmitted to the mobile device for rendering, via the NFC transmission from the contactless card. With respect to the aforementioned scenario, NFC transmission of the authentication message may be initiated by conducting an NFC read of the contactless card by a NFC reader application, running on the mobile device.

In some embodiment, the raw image data may be directly read from the contactless card by a website via web near filed communication (WebNFC) and transmitted, via a network connection, from a web server hosting the WebNFC-enabled website, to a mobile browser, on the mobile device, for rendering. The raw image data may be associated with a high entropy pattern to exaggerate GPU differences in the rendered output (e.g., the rendered image data). In accordance with some embodiments, the image may be rendered by the mobile browser in a fixed size frame buffer to prevent changes in rendered image data resulting from different screen resolutions.

In some aspects, the techniques described herein relate to a multi-factor authentication system based on integrating device binding functionality with OTP authentication card, the system including a computer hardware arrangement configure to: provide a first image data associated with an image, to a mobile browser running on a mobile device of a user, the first image data received, as part of an authentication message, in response to a user authentication request, from a contactless card associated with the user; render the image from the first image data using a web graphics library (WebGL) functionality associated with the mobile browser, to generated a second image data; generate an image hash identifier from the second image data; map the image hash identifier with a graphics processing unit (GPU) associated with the mobile device to bind the mobile device with the authentication message transmitted from the contactless card; compare, by an authentication server, the image hash identifier received from the mobile device, to one or more previously stored hash identifiers associated with one or more previous user authentication requests; verify, by the authentication server, the mobile device based on determining a match between the image hash identifier received from the mobile device in response to the user authentication request and the one or more previously stored hash identifiers associated with one or more previous user authentication request.

In some aspects, the techniques described herein relate to a system, wherein the system is further configured to encode, into the authentication message, a uniform resource locator (URL) pointing to an image hosted on a web server, the URL directing the mobile browser to retrieve the first image data from the web server. The URL may include embedded instructions for redirecting to multiple images to be periodically rotated, the multiple images being stored on the web server.

In some aspects, the techniques described herein relate to a system, wherein the first image data is stored on the contactless card and transmitted to the mobile device, for rendering, via a NFC transmission from the contactless card, the NFC transmission further including an image identifier corresponding to a multipurpose internet mail extensions (MIME) media type of the image, to facilitate the rendering of the image by the WebGL functionality of the mobile browser.

In accordance with some embodiments, the first image data may correspond to raw image data having a high entropy pattern to exaggerate GPU differences in generating the second image data, the second image data corresponding to rendered image data.

In some aspects, the techniques described herein relate to a non-transitory computer-accessible medium including instructions for execution by a computer hardware arrangement, wherein, upon execution of the instructions the computer hardware arrange is configured to perform procedures including: receiving an authentication message, via a near field communication (NFC) transmission, by a mobile device from a contactless card, the authentication message, corresponding to a user authentication request, being operative to provide raw image data associated with an image, to a mobile browser running on the mobile device; rendering, by the mobile browser, the image associated with raw image data, using a web graphics library (WebGL) application programming interface (API); generating an image hash identifier from rendered image data generated by the mobile browser using the WebGL API, the image hash identifier corresponding to the user authentication request; mapping the image hash identifier with a graphics processing unit (GPU) associated with the mobile device to provide binding between the mobile device and the authentication message provided by the NFC transmission from the contactless card; comparing, by an authentication server, the image hash identifier received from the mobile device, to one or more previously stored hash identifiers associated with one or more previous user authentication requests; verifying, by the authentication server, the mobile device based on determining a match between the image hash identifier received from the mobile device in response to the user authentication request and the one or more previously stored hash identifiers associated with one or more previous user authentication request.

In some aspects, the techniques described herein relate to a non-transitory computer-accessible medium, further including instructions for encoding, into the authentication message, a uniform resource locator (URL) pointing to an image hosted on a web server, the URL directing the mobile browser to retrieve the first image data from the web server. In some embodiments, the non-transitory computer-accessible medium may further include instructions for redirecting to multiple images to be periodically rotated.

In some aspects, the techniques described herein relate to a non-transitory computer-accessible medium, further including instructions for rendering the image directly from the NFC transmission received from the contactless card, the NFC transmission including raw image data and a multipurpose internet mail extensions (MIME) media type associated with the image, and stored on the contactless card.

DETAILED DESCRIPTION

Figure 1:
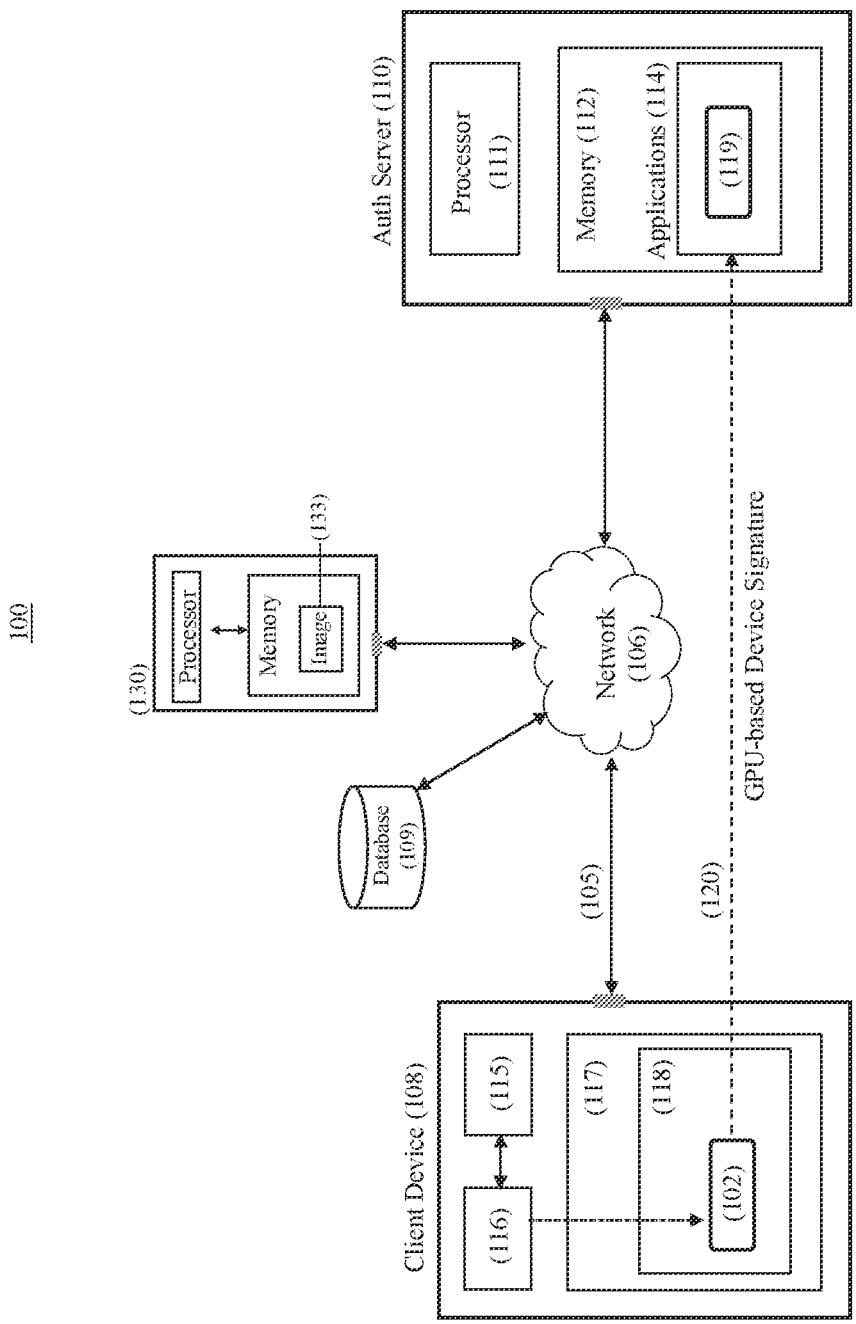
FIG. 1 illustrates an exemplary system implementation of an authentication process with device binding, in accordance with some embodiments of the present disclosure.

The following description of embodiments provides non-limiting representative examples referencing numerals to particularly describe features and teachings of different aspects of the invention. The exemplary embodiments described will be recognized as capable of implementation separately, or in combination, with other embodiments from the description of the embodiments and the features and teachings of any embodiment can be interchangeably combined with the features and teachings of any other embodiment. A person of ordinary skill in the art reviewing the description of exemplary embodiments will learn and understand the different described aspects of the invention. The description of exemplary embodiments should facilitate understanding of the invention to such an extent that other implementations, not specifically covered but within the knowledge of a person of skill in the art having read the description of exemplary embodiments, will be understood to be consistent with an application of the invention.

Furthermore, the described features, advantages, and characteristics of the exemplary embodiments may be combined in any suitable manner. A person of ordinary skill in the art will recognize that the exemplary embodiments may be practiced without one or more of the specific features or advantages of an exemplary embodiment. In other instances, additional features and advantages may be recognized in certain exemplary embodiments that may not be present in all exemplary embodiments. One skilled in the art will understand that the described features, advantages, and characteristics of any exemplary embodiment can be interchangeably combined with the features, advantages, and characteristics of any other exemplary embodiment.

One aspect of the proposed system and process is directed to a device binding authentication approach that utilizes a distinct computational flow of a graphics processing unit (GPU) to derive a device signature and/or fingerprint for verifying a source device. More specifically, the invention leverages the NFC based connectivity of cryptographic OTP authentication cards to provide an input image, read by an NFC reader, for processing on a mobile device. The image would correspond to a high entropy pattern to exaggerate GPU differences in the rendered output. The output of the image processing buffer associated with a browser application (equipped with a WebGL API) running on the mobile device, can then be hashed and used as a device identifier for the specific mobile device. The proposed device binding approach can be readily integrated with the cryptographic OTP authentication process to enhance authentication strength of an OTP card authentication signal, by verifying, with high degree of certainty, the identity of the card-reading device.

The proposed solution provides a factor of authentication strength (based on using a GPU-based device signature as a device verification signal) without requiring additional authentication actions by a user. This is of inherent value in secure electronic transaction processing. Furthermore, the inventive process may be operationally integrated with contactless OTP card technology, by leveraging the NFC nature of the encrypted OTP authentication process. This will enhance the strength of the authentication process with a verifiable GPU signature associated with the source device.

FIG. 1 illustrates an exemplary system implementation 100 for an authentication process with device binding functionality based on GPU fingerprinting (e.g., providing a unique processing signature associated with a specific GPU). In some embodiments, a GPU fingerprinting process may be implemented for determining a device signature (e.g., based on an operational signature associated with a GPU of the device) for a client device 108. The GPU fingerprinting process 102 may be implemented as part of a WebGL-supplemented mobile browser, represented by applications 118, on the client device 108, as illustrated in FIG. 1.

In some embodiments, a device signature for facilitating device-binding authentication, may be implemented as a function of the image rendering process associated with a specific GPU (e.g., GPU 116). The image rendering process associated with GPU 116 may be performed on an input image 133 retrieved from an image storing device (e.g., image hosting server 130) As shown in FIG. 1, the GPU fingerprint computation process 102 may be implemented as part of browser functionality, having a WebGL extension, running on the client device 108 (e.g., a mobile device associated with a user). The exemplary system implementation 100 further comprises, a network 106, an authentication server 110, a database 109, and an image hosting device/server 130. Although FIG. 1 illustrates single instances of components of system 100, system 100 may include any number of components.

The Authentication server 110 may include one or more processors 111, and memory 112. Memory 112 may include one or more applications, such as applications 114. According to the exemplary embodiment 100, a device signature verification process 119 may be implemented as part of applications 114 stored on the Authentication server 110. The Authentication server 110 may be in data communication with any number of components of system 100. For example, Authentication server 110 may be configured as a central system, server or platform to control and call various data at different times to execute a plurality of workflow actions such as verification of a device signature 120, computed by the process 102 running on the client device 108 and transmitted to the authentication server for verification. Authentication server 110 may be configured to connect to client device 108 and image hosting device 130. Client device 108 may be in data communication with the applications 114 running the device signature verification process 119. For example, the client device 108 may be in data communication with applications 114 and the image hosting device 130 via one or more networks 106. The Authentication server 110 may transmit, for example from applications 114 executing thereon, one or more requests to client device 108. The one or more requests may be associated with retrieving a device signature 120 from the client device 108. Client device 108 may receive the one or more requests from Authentication server 110. Without limitation, the Authentication server 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. The Authentication server 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The Authentication server 110 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The Authentication server 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the authentication server that is available and supported by the authentication server, such as a touch-screen, keyboard, mouse, cursor-control device, touch-screen, microphone, digital camera, video recorder or camcorder. These devices may be used to enter information and interact with the software and other devices described herein.

The information used by the device signature verification process 119 running, for example, on the authentication server 110, may comprise one or more user authentication data (associated with a target user account) provided, via the client device 108, across network 106, and/or one or more stored device signature records (computed based on image 133) and corresponding to previous device authentication attempts initiated from the client device 108 and transmitted to the authentication server 110 across network 106.

In some examples, network 106 may be one or more of a wireless network, a wired network or any combination of wireless network and wired network, and may be configured to connect to any one of components of system 100. For example, the Authentication server 110 may be configured to connect to client device 108 via network 106. In some examples, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 106 may include, without limitation, telephone lines, fiber optics, IEEE Ethernet 902.3, a wide area network, a wireless personal area network, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

As shown in the exemplary system implementation 100, illustrated in FIG. 1, client device 108 may include one or more processors 115 coupled to a GPU 116 and memory 117. The client device 108 can be configured as a central system, server or platform to control and call various data at different times to execute a plurality of workflow actions. The client device 108 can be configured to connect to any component of system 100 via network 106. The client device 108 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single client device 108, it is understood that other embodiments can use multiple servers or multiple computer systems as necessary or desired to support the users and can also use back-up or redundant servers to prevent network downtime in the event of a failure of a particular server.

The client device 108 can be in data communication with the image hosting device/server 130 as well as the processor 111 of the authentication server 110. For example, client device 108 can be in data communication with processor 111 of the authentication server 110 via one or more networks 106. The Authentication server 110 may transmit one or more requests to the client device 108. The one or more requests can be associated with retrieving data from the client device 108, and may be generated in response to an authentication request from a source device (e.g., client device 108). The client device 108 can receive the one or more requests from any component of authentication server 110. The client device 108 can be configured to transmit the requested data to the processor 111 of the authentication server 110.

The client device 108 can include a processor 115. The processor 115 can be, for example, one or more microprocessors. The processor 115 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The client device 108 may include one or more applications 118 comprising instructions for execution thereon. For example, the application can reside in memory 117 of client device 108 and can comprise instructions for execution on the client device 108. The application 118 of the client device 108 can be in communication with any components of system 100. For example, client device 108 can execute one or more applications that enable, for example, network and/or data communications with one or more components of system 100 and transmit and/or receive data. Without limitation, the client device 108 can be a network-enabled computer. As referred to herein, a network-enabled computer can include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The functionality associated with the client device 108 may also be implemented on a mobile device; for example, a mobile device can include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 108 can include processing circuitry and can contain additional components, including processors, GPUs, memories, error and parity/CRC checkers, data encoders, anticollision algorithms, controllers, command decoders, security primitives and tamper-proofing hardware, as necessary to perform the functions described herein. The client device 108 can further include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the client device that is available and supported by the client device, such as a touch-screen, keyboard, mouse, cursor-control device, touch-screen, microphone, digital camera, video recorder or camcorder. These devices can be used to enter information and interact with the software and other devices described herein.

System implementation 100 can include one or more databases 109. The one or more databases 109 can comprise a relational database, a non-relational database, or other database implementations, and any combination thereof, including a plurality of relational databases and non-relational databases. In some examples, the databases 109 can comprise a desktop database, a mobile database, or an in-memory database. Further, the one or more databases 109 can be hosted internally by any component of system 100, such as the authentication server 110 and/or the client device 108. The one or more databases 109 can also be hosted externally to any component of the system 100, by a cloud-based platform, or in any storage device that is in data communication with the authentication server 110 and the client device 108. In some examples, the databases 109 can be in data communication with any number of components of system 100. For example, the client device 108 can be configured to retrieve the data requested by processor 111 of the authentication server 110 from the databases 109. Client device 108 can be configured to transmit the received data from databases 109 to the processor 111 via network 106, the received data being responsive to the transmitted one or more requests. In other examples, the processor 111 can be configured to transmit one or more requests for the requested data to the databases 109 via network 106.

Figure 2:
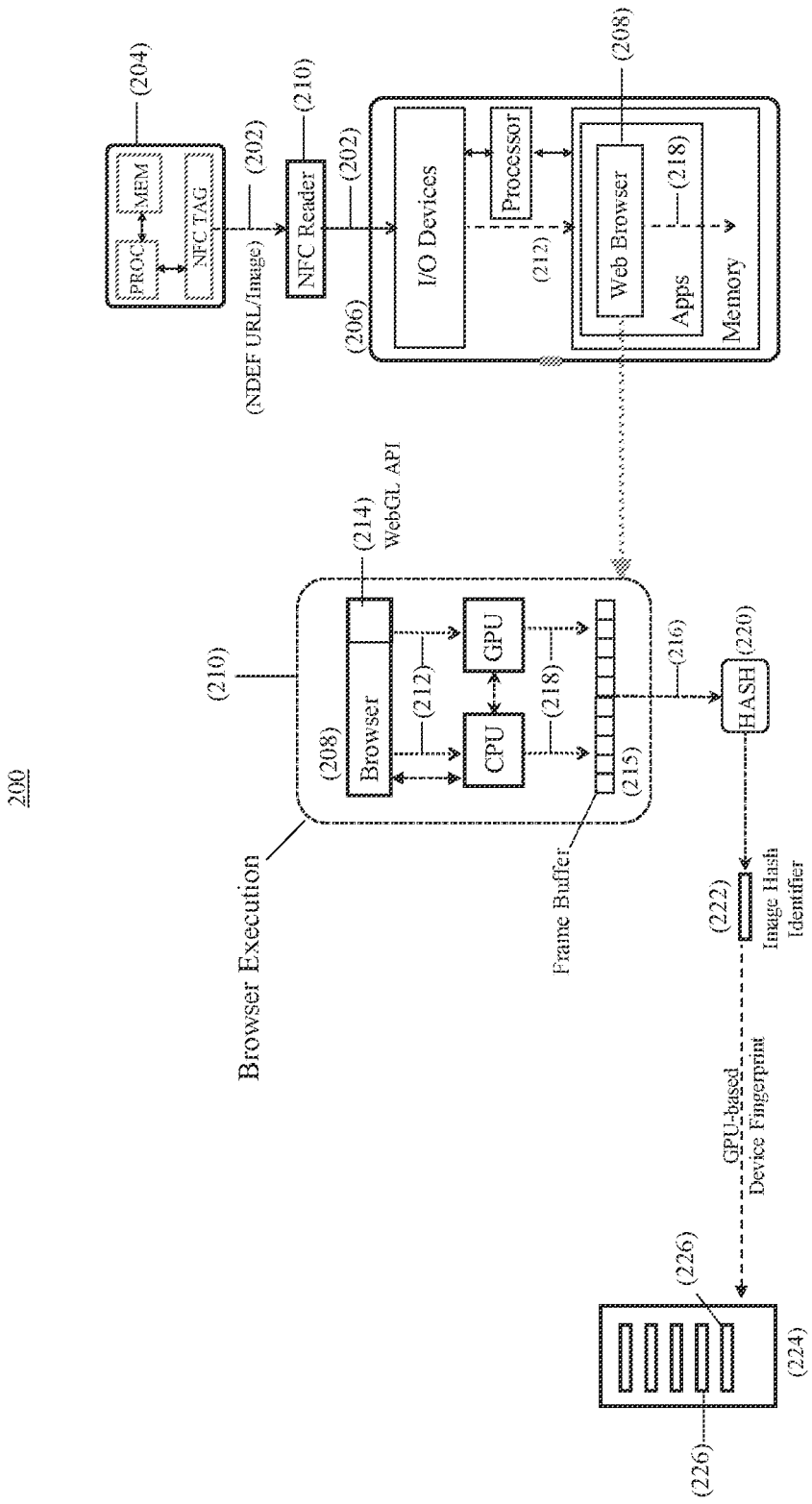
FIG. 2 illustrates an overview of a mobile browser operation in generating a device fingerprint based on an image hash identifier, in accordance with some embodiments of the present disclosure.

An overview of an exemplary mobile browser operations for generating a device fingerprint based on a hashed image identifier is illustrated in FIG. 2. The hashed image identifier may be computed by processing rendered image data, associated with an input image, with a cryptographic hash function. The rendering process of the mobile browser may utilize the graphics processing unit (GPU) of a mobile device via an integrated web graphics library (WebGL) functionality. Web graphics library (WebGL) is an application programing interface (API) used for graphics rendering that can be completely controlled by the web browser. WebGL specification allows internet browsers access to graphics processing unit (GPU) on the device which enables the GPU to be incorporated into the graphics computation performed by a web browser running on a mobile device. This facilitates GPU hardware accelerated architecture for graphics processing directly by the browser application. The output of the WebGL supplemented image rendering process will correspond to a rendered image data (e.g., a digital image) that may be stored in a frame buffer (e.g., a portion of the read access memory which contains a complete frame data intended for output to a display). In GPU accelerated computing, the raw image data may be loaded into the GPU. Whenever the rendering process encounter a compute-intensive portion of the code, then that portion of the code may be loaded and run on the GPU.

Differences in operating system type and version as well as other software and hardware difference and performance characteristics may result in different computation paths and different set of operations performed by a GPU in rendering an image. This may results in differences in the pixel output associated with the rendition of the image in compressed form. The difference in a pixel output of a GPU may be specially exaggerated if an input image being rendered corresponds to a highly entropic data pattern that is very hard to compress.

In some embodiments information regarding the WebGL version as well as information regarding the operating system version may be extracted based on the specific pixel output of a image rendering process and encoded into a hash identifier computed on the rendered image data. The hash identifier may then serve as a device fingerprint. FIG. 2 illustrates an overview of an exemplary process for enhancing one time password (OTP) card authentication with GPU-based device binding. The exemplary process 200 utilizes the NFC data transmission 202, transmitted from a contactless card 204 to a computing device (e.g., mobile device 206), to facilitate the image rendering process by a mobile internet browser 208 running on the mobile device 206. FIG. 2 further illustrates the operations of the mobile browser 208 for generating a device fingerprint from rendered image data processed with a cryptographic hash function. The image rendering process performed by the mobile browser 208 may incorporate web graphics library (WebGL) functionality in order to utilize a graphic processing unit (GPU) of the mobile device (206) in the image rendering process, thus inserting into the rendered image data a processing signature of the corresponding GPU.

The operations of the mobile browser directed at GPU-supplemented rendering of an input image using WebGL API is illustrated in diagram 210. Based on the process illustrated in diagram 210 an image processing signature may be derived and used as a device fingerprint for the computing device (e.g., mobile device 206). As described, the process may be invoked in response to a near field communication (NFC) transmission 202 from the contactless card 204. The NFC transmission 202 may include an authentication message comprising a uniform resource locator (URL) pointing to the image (e.g. raw image data) to be retrieved by the mobile browser 208. In some embodiments the authentication message, transmitted via the NFC transmission 202, may comprise the raw image data stored locally on an NFC tag of the contactless card.

The authentication message transmitted from the contactless card 204 may be received by a NFC reader 210 and passed over to the mobile device 206 for processing. The NFC reader 210 may be integrated into the mobile device 206. In some embodiments, corresponding, for example, to scenarios when a NFC reading application and/or capability is not available on computing and/or mobile device, WebNFC functionality may be encoded in a website to enable direct reading of the contactless card 204 by the website, launched, from example, on a personal computer (PC) terminal. Various embodiments for passing the raw image data 212 to a computing device by utilizing the NFC read capability of contactless (OTP) card 204 are further discussed in relation to FIGS. 3, 4 and 5.

Referring back to FIG. 2, once the browser application (208) receives the raw image data 212, whether directly from NFC transmission 202, or via the URL encoded therein, the browser may utilize the computing resources provided by the graphics processing unit (GPU) to process and render the image. The GPU functionality may be accessed through a WebGL API 214 incorporated into the browser application 208.

The output of the image rendering process (e.g., rendered image data 218) may be written into a frame buffer 215. The frame buffer 215 may store the rendered image data 218 that can be displayed as a digital image. The content 216 of the fame buffer 215 may then be hashed with a cryptographic hash function 220 to generate an image hash identifier 222. As described earlier, the raw image data 212 may be associated with a high entropy data pattern to exaggerate GPU differences in the rendered output (218). In some embodiments the framebuffer 215 may correspond to a fixed sized buffer in order to prevent changes in rendered image data 218 resulting from different screen resolutions associated with the computing/mobile device 206.

The image rendering process 210, by utilizing a distinct computational flow of the GPU, may generate an output (e.g., rendered image data 218) that possess a unique device-specific signature. Accordingly, hashing the rendered image data provides an hash identifier 222 that may serve as a GPU-based device fingerprint for verifying a source device. The hash identifier 222 (interchangeably referred to as image hash identifier) may then be mapped to the GPU of the mobile device 206 and used as a GPU-based device fingerprint for the mobile device 206. The GPU-based device fingerprint 222 may then be transmitted, for verification, to an authentication server (e.g., back-end authentication server 224) storing one or more user-device fingerprint records 226 associated with previous authentication requests initiated by the contactless card 204 via the mobile device 206. In some embodiments the generated GPU-based device fingerprint may be integrated into operations of the contactless OTP authentication card (e.g., contactless card 204) to add a factor of strength to the OTP card authentication signal.

In some examples, exemplary procedures in accordance with the present disclosure described herein can be performed by a computer hardware arrangement. Such a computer hardware arrangement can be, for example entirely or a part of, or include, but not limited to, a computer and/or processor that can include, for example one or more microprocessors, and use instructions stored on a non-transitory computer-accessible medium (e.g., RAM, ROM, hard drive, or other storage device). For example, a computer-accessible medium can be part of the memory of the systems and devices described herein and/or other computer hardware arrangements.

In some examples, a computer-accessible medium (e.g., as described herein, a storage device such as a hard disk, floppy disk, memory stick, CD-ROM, RAM, ROM, etc., or a combination thereof) can be provided (e.g., in communication with the computer hardware arrangement). The computer-accessible medium can contain executable instructions thereon. In addition or alternatively, a storage arrangement can be provided separately from the computer-accessible medium, which can provide the instructions to the computer hardware arrangement. The instructions can configure the computer hardware arrangement to execute certain exemplary procedures, processes, and methods, as described herein above, for example.

Figure 3:
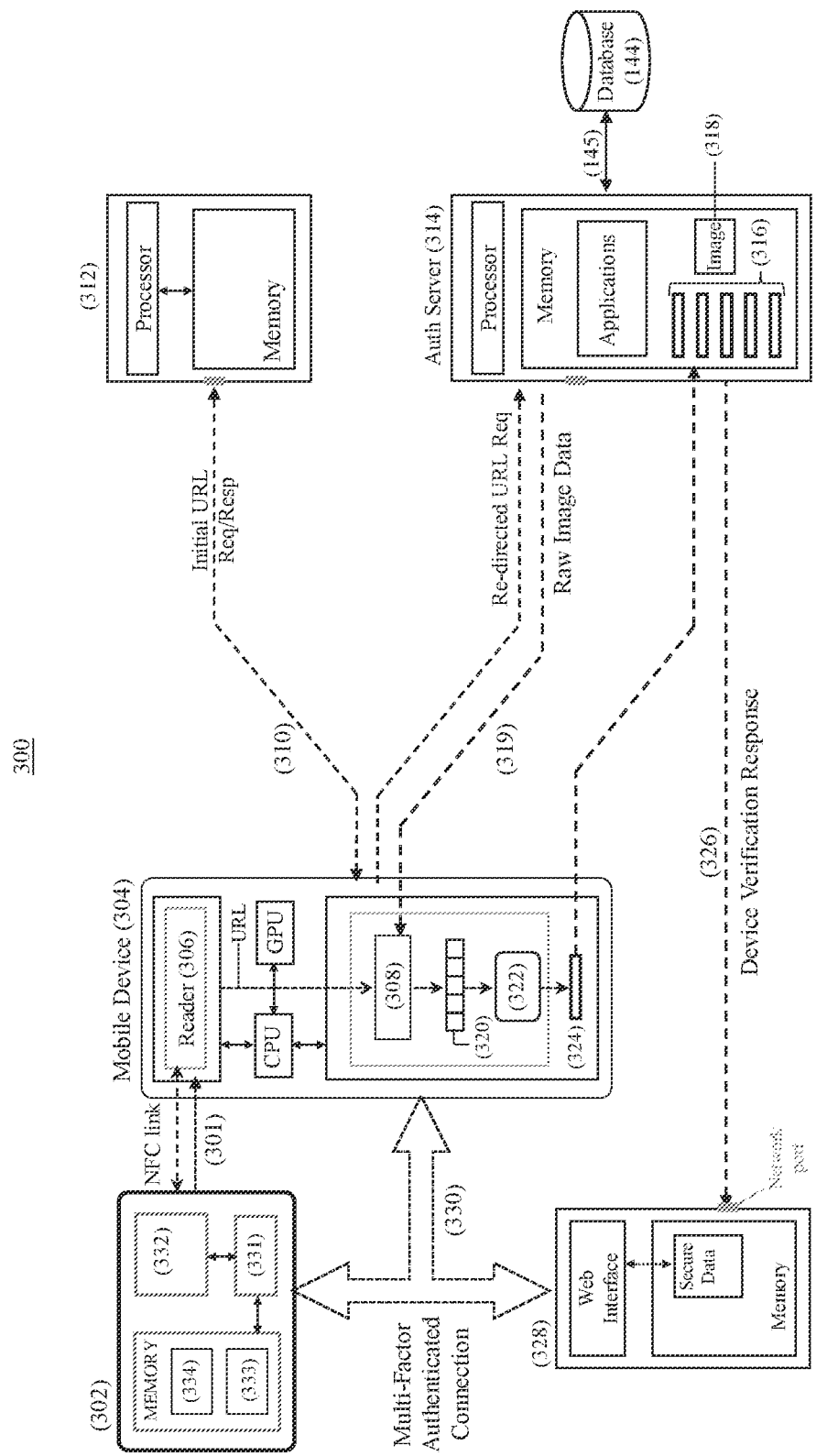
FIG. 3 illustrates a device-binding authentication approach based on GPU-based device fingerprinting facilitated by an image URL transmitted via NFC from a contactless card, in accordance with exemplary embodiments of the present disclosure.

FIG. 3 illustrates an exemplary implementation of GPU-based (mobile) device authentication, initiated by a NFC transmission of an image URL 301 from a contactless card 302 to facilitate computation of a GPU-based device signature for the mobile device 304. In some embodiment the computed device signature/fingerprint may be used as an authentications factor in a multi-factor authentication process (e.g. as indicated by multifactor authenticated connection 330 in FIG. 3) for validating electronic data access requests and/or a merchant transaction initiated by using the contactless card 302 and the mobile device 304.

Referring back to FIG. 3, the computation of the GPU-based device signature may be initiated by conducting an NFC read of an authentication record, stored on the contactless card 302, by NFC reader 306 (e.g., with a corresponding reader application, not shown in FIG. 3, running on the mobile device 304). The NFC-transmitted authentication records may comprise an image URL 301 which points to an image data file (e.g. raw image data) to be retrieved by the mobile device 304. Once retrieved by the mobile device 304, the URL may be passed to a browser application 308 running on the mobile device.) In some embodiments, an initial URL request message, by the mobile browser 308, may be re-directed to a destination server hosting the image (e.g., storing the raw image data). This is shown by the initial URL request/response communication 310 between the mobile device 304 and a destination identified by the URL (e.g. server 312). The image 318 may then be retrieved from the hosting server (e.g., authentication server 314). Authentication server 314 may further store one or more data records 316 corresponding to previous hash identifiers of the image 318 associated with previous successful authentication attempts (using the device fingerprint) initiated from the mobile device 304.

With reference to FIG. 3, the raw image data 319 (associated with image 318), may be retrieved from the authentication server 314, and processed by the mobile browser 308, running on the mobile device 304, to generate rendered image data in a framebuffer 320. The framebuffer data may then be hashed by a cryptographic hash process 322 to generated an image hash identifier 324 that may serve as a GPU-based device fingerprint for the mobile device 304. The image hash identifier 324 may be transmitted to the authentication server 314 for comparing with previously stored image hash identifiers 316 associated with previous device authentication attempts using the mobile device 304. If the comparison with a previously stored image hash identifier produce a match, signifying that the same device was used in previous authentication attempts, a device verification response 326 may be generated and transmitted to an authentication requesting server 328. The device verification response 326 may correspond to a standalone authentication response, or it may be incorporated as part of a multi-factor authentication (e.g., multifactor authenticated connection 330) along with other encrypted user identification data that may be stored on the contactless card 302 and transmitted along with the device signature 324. Accordingly, the integration of a GPU-based device fingerprint (e.g., 324) into the cryptographic authentication process associated with an OTP authentication card (e.g., 302) facilitates a multifactor authenticated connection 330 between the mobile device (as initiated by the contactless card 302), and a destination server 328.

In some embodiments, the contactless card 302 may correspond to a uniquely configured OTP contactless card with an integrated processor 331 and a NFC tag 332 storing NFC transmittable user authentication data (readable, for example, by a mobile device with a reader component and running a corresponding application) The contactless card 302) may further comprise a counter 333, also referred to as application transaction counter (ATC), for keeping track of OTP transactions initiated by the contactless card, as well as one or more applets 334 for facilitating the generation of the OTP authentication cryptogram. In some embodiments the transaction counter value may be updated for each OTP transaction initiated by the contactless card.

In some embodiments, the URL may comprise embedded instructions for rendering to multiple images to be periodically rotated. The multiple images may be stored on a designated web server and/or multiple distinct servers.

Figure 4:
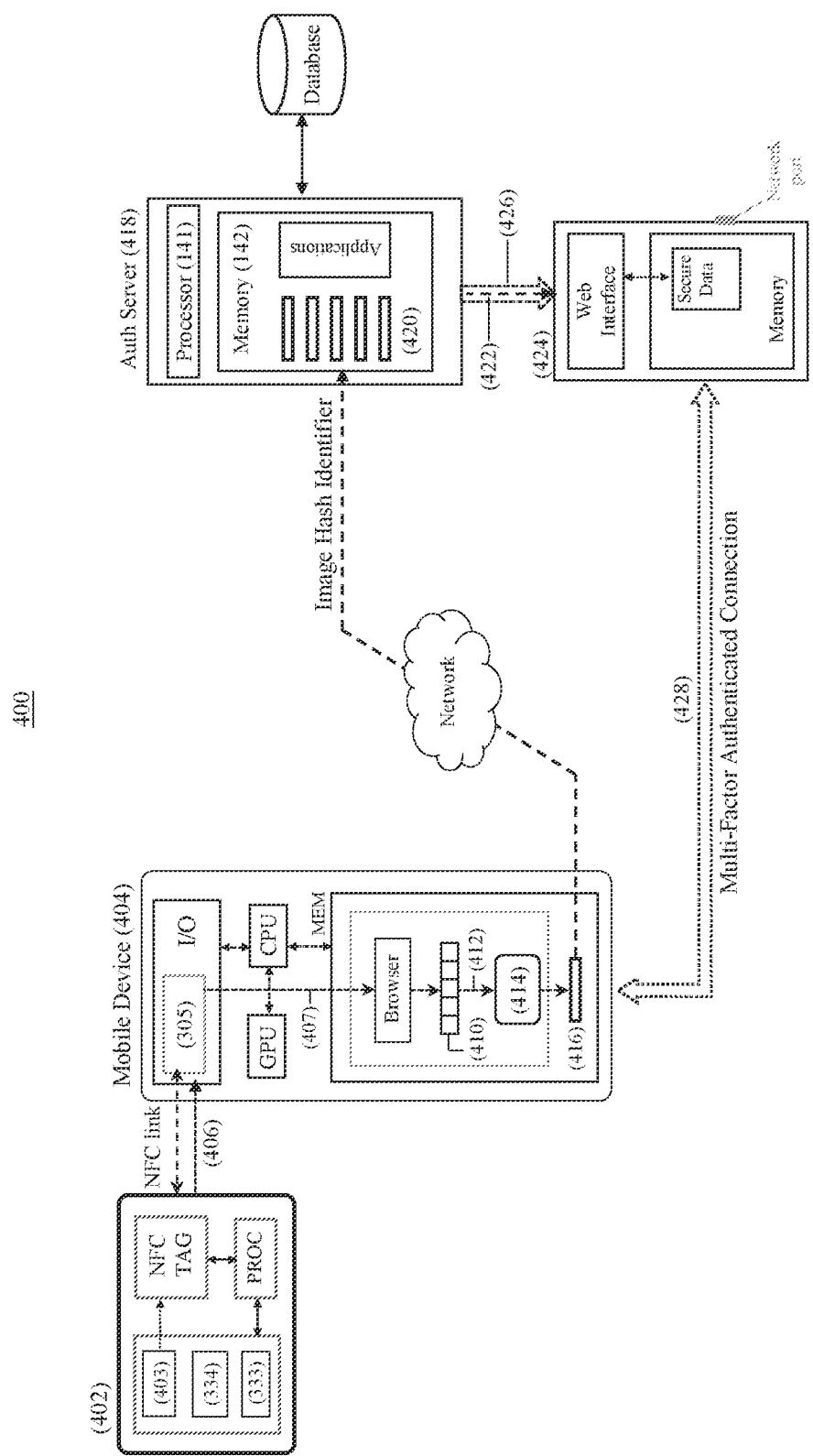
FIG. 4 illustrates a device-binding authentication approach based on a GPU-based device fingerprint computed from image data directly retrieved from a contactless card, in accordance with exemplary embodiments of the present disclosure.

FIG. 4 illustrates an exemplary embodiment 400 wherein the raw image data is directly stored onto the contactless card 402, for example, as a near field communication data exchange format (NDEF) file 403. In the embodiment 400 the NFC transmission 406 may correspond to the raw image data and an image identifier, corresponding to a multipurpose internet mail extensions (MIME) media type, stored on the contactless card 402 as an NDEF file 403. The NDEF file comprising the raw image data and the image MIME type, is transmitted to the reader 405 of the mobile device in response to bringing the contactless card within NFC range of the mobile device with an operational NFC reader (e.g., tapping the contactless card on the reader of the mobile device.) Upon receiving the NFC transmission 406, the raw image data 407 may be passed to and processed by the mobile browser running on the mobile device 404 to generate a rendered image data in a framebuffer 410. The framebuffer data 412 is then hashed by a cryptographic hash process 414 to generated an image hash identifier 416 that may server as a GPU-based device fingerprint. The hashed image identifier is transmitted to the authentication server 418 to be compared with stored records 420 corresponding to previously stored hash identifiers of the NDEF image file 403 associated with previous device authentication attempts initiated from the mobile device 404. If a match is determined, signifying that the same device was used in previous authentication attempts, a device verification response 422 is generated and transmitted, for example, to an authentication requesting server 424. The device verification response 422 may be provide as a standalone device-binding authentication signal pertaining to mobile device 404 and/or as part of a multi-factor authentication 426 along with other encrypted user identification data that may be stored on the contactless card 402 and transmitted along with the mobile device fingerprint 416. This can then facilitate the multifactor authenticated connection 428 to the destination server 424 based on an authenticated pairing of the contactless card 402 and the mobile device 404.

Figure 5:
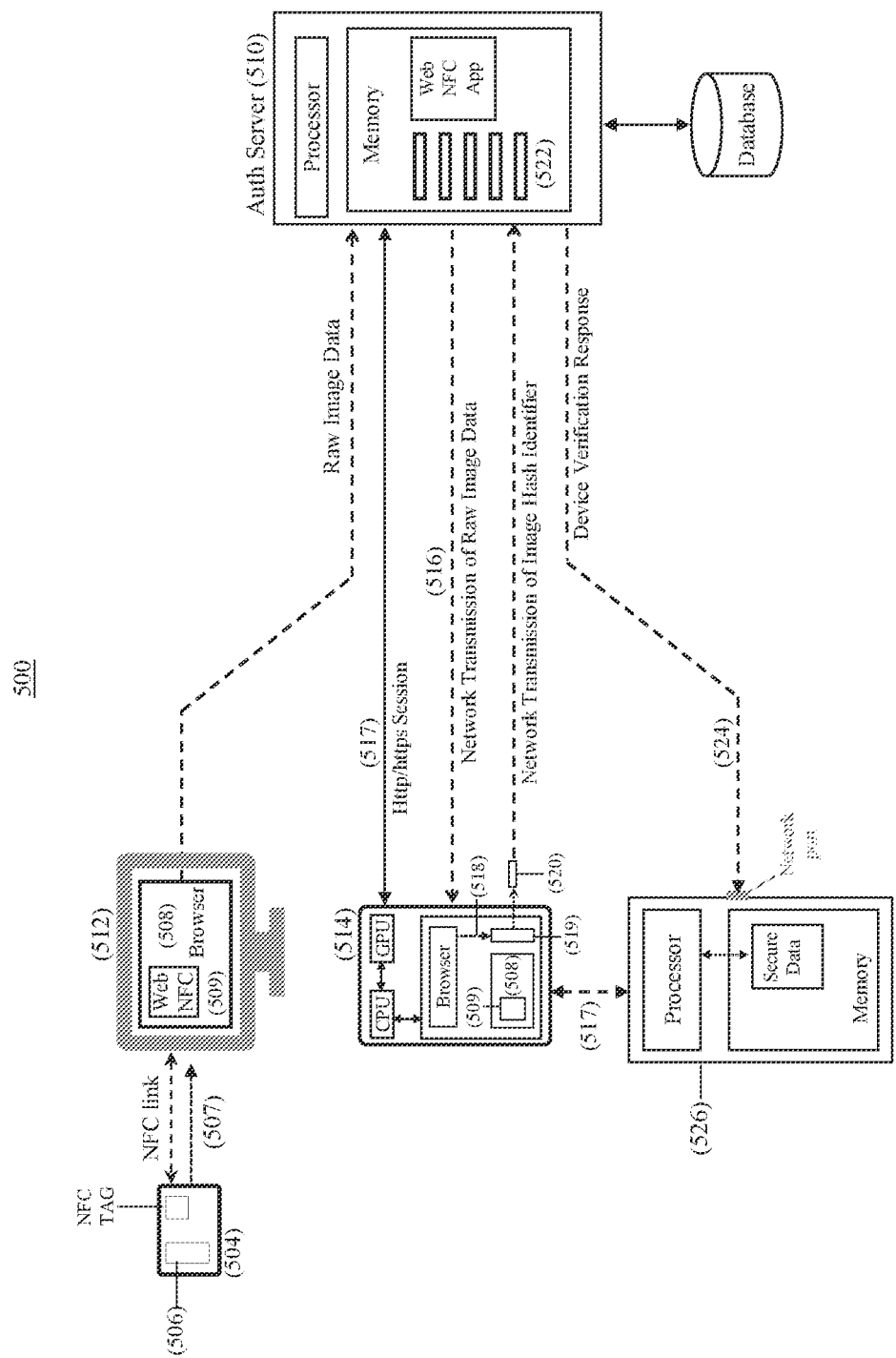
FIG. 5 illustrates a GPU-based mobile device verification process based on direct NFC read of a contactless card by a website using WebNFC and network transmission of input image data to the mobile device, in accordance with exemplary embodiments of the present disclosure.

FIG. 5 illustrates an embodiments for supporting a scenario wherein a mobile device (e.g., mobile device 502) may not have NDEF read capability and/or an NFC application for establishing an NFC link with a contactless card 504. In such a scenario, the input image 506 (e.g., raw image data along with an image MIME type) may be retrieved from the contactless card 504 via a direct NFC read 507 of the contactless card by a verification website 508, using a web near filed communication (WebNFC) API 509. WebNFC is a low-level API that provides websites the ability to read and write to nearby NFC devices. The (WebNFC-enabled) verification website 508 may be provided by the authentication server 510 and accessed, for example, through a browser application running on a personal computer 512. The input image data 506 may then transmitted to a user mobile device (e.g., via network transmission 516) by the authentication server 510 across a network connection 517 established between the authentication server 510 and the user mobile device. Subsequently the image data retrieved (directly from the contactless card) by the verification website (e.g., via a WebNFC process), may be sent to a registered mobile device (e.g., mobile device 514, associated with the user), for rendering. The rendered image data 518 may then be read directly from the browser and hashed (e.g., by a cryptographic hash function 519) to generate an image hash identifier 520. The image hash identifier 520, representing a digital fingerprint associated with the mobile device 514, is transmitted to the authentication server 510 for verification against previous authentication records 522. If a match is determined, the authentication sever 510 may determine that the received message has not been spoofed by a different device (e.g., different than mobile device 514) that may be used by a hacker to facilitate a fraudulent user verification process and subsequently transmit a device verification response 524 to an authentication requesting entity (e.g., merchant server 526).

In some embodiment the WebNFC-enable website 508 may be launched directly on the mobile device 514 to facilitate NFC-based retrieval of image data, via the direct NFC read 507, from the contactless card 504.

As descried above, WebNFC functionality may be encoded in a website to enable direct reading of the contactless card 504 by the WebNFC-enabled website, launched on a computing and/or a mobile device associated with a user. In some embodiment, WebNFC functionality may be encoded in a merchant website to enable direct reading the contactless card 504 by the WebNFC-enabled merchant website, launched on a computing and/or a mobile device associated with a user. The input image data may then be directly read from the contactless card by the merchant web server (via the WebNFC-enabled merchant website) and transmitted to a mobile device associated with a phone number that may be provided by the user initiating the transaction. The image may then be rendered by a mobile browser (using WebGL API) running on the mobile device, and a hash identifier of the rendered image, transmitted back to the merchant webserver. The merchant webserver may then transmit the hash identifier (e.g., device fingerprint) to an authentication server for verification against previous authentications records. If a match is determined, the authentication sever may send a device verification response to the merchant webserver.

Figure 6:
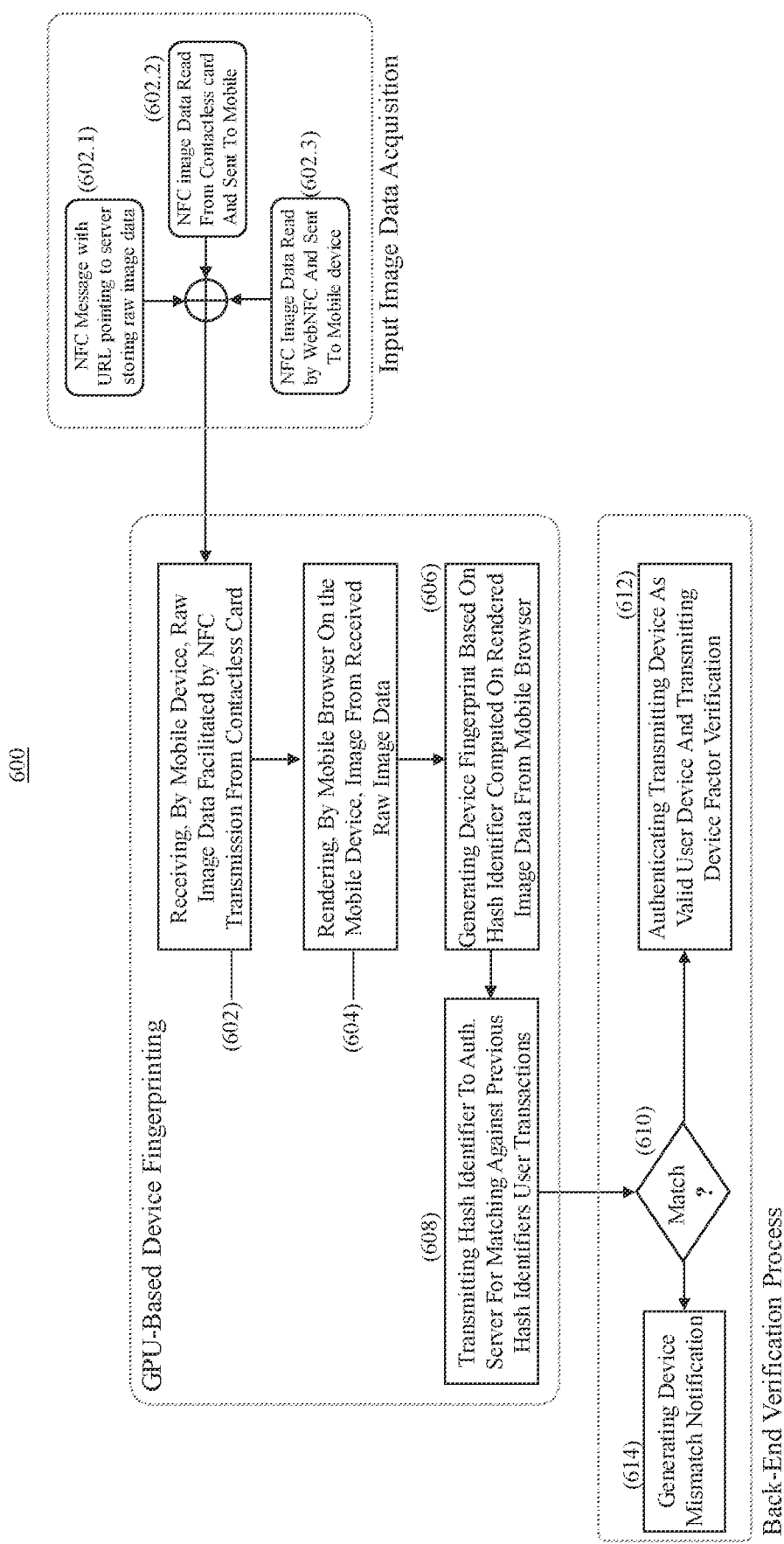
FIG. 6 illustrates a flowchart of an exemplary process for device-binding authentication comprising input image data acquisition for generation and verification of a GPU-based device signature, in accordance with exemplary embodiments of the present disclosure.

FIG. 6 illustrate an exemplary operational flowchart 600 for generation and verification of a GPU-based mobile device fingerprint. The exemplary process 600 may be initiated by acquisition of an input image (e.g., raw image data to be rendered by a WebGL-enabled browser running on a mobile device.) The acquisition of the raw image data may be facilitated by a NFC transmission from a contactless card as shown in step 602. The acquisition of the raw image data by the mobile device may be implemented by any of the operations described in steps 602.1, 602.2 or 602. 3. For Example, the NFC transmission, from the contactless card to the mobile device reader, may comprise a URL pointing to a server which hosts the raw image data (e.g., step 602.1) Alternatively, the NFC transmission, from the contactless card to the mobile device reader, may comprise the actual raw image data, stored along with an image identifier, in an NDEF file on the contactless card (e.g., step 602.2) The NFC transmission may also be initiated between a website and the contactless card, using WebNFC and transmitted, via a network connection, to the mobile device (e.g., step 602.3).

Upon retrieval of the raw image data at step 602, the retrieved image data is rendered, using a WebGL process, by a corresponding mobile browser, at step 604. The output of the image rendering process, associated with a specific GPU signature, is then hashed at step 606 to generate an image hash identifier representing a GPU-based device fingerprint. The image hash identifier (e.g., mobile device fingerprint) may then be transmitted to an authentication server for verification at step 608. The Authentication server may be storing records corresponding to previous hash identifiers of the input image associated with previous authentication attempts. The verification process, at step 610, may involve matching the received image hash identifier with one or more previously stored image hash identifiers (e.g., previous authentication records.) In some embodiment, the comparison may involve the most recently stored device fingerprint record. If a positive match is determined at step 610, the mobile device is authenticated as a valid user device, at step 612, and a device-factor authentication may be added to an OTP authentication process associated with the contactless card. If a match is not determined at step 610 a device mismatch notification may be generated at step 614 and transmitted back to a authentication requesting party and/or the transmitting mobile device.

Figure 7:
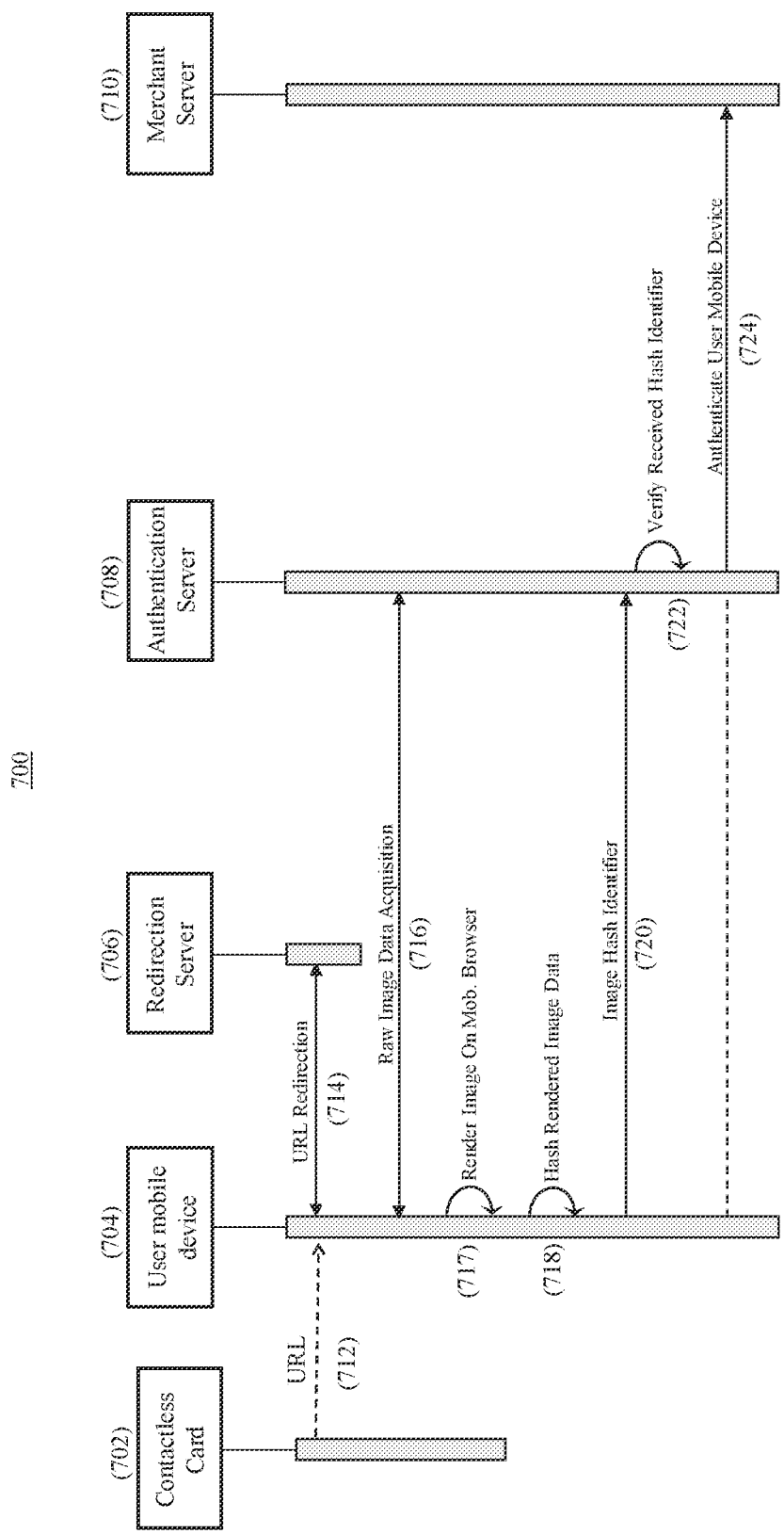
FIG. 7 illustrates a timing sequence diagram for a GPU-based device binding authentication, using an NFC transmitted image URL, in accordance with exemplary embodiments of the present disclosure.

FIG. 7 illustrate a timing sequence associated with an exemplary GPU-based device verification process 700. The exemplary process 700 corresponds to a URL-directed acquisition of an input image (e.g., raw image data from a contactless card 702), by a mobile device 704 communicatively coupled to a redirection server 706 and/or authentication server 708. The computed GPU-based device fingerprint may then be used as an authentications factor in validating electronic data access requests and/or a user transaction with a secure system (e.g., merchant server 710), initiated from the mobile device 704. The exemplary process 700 may be triggered by a NFC-based reading of an image URL (e.g., a URL pointing to a raw image data file) by a reader component (with a corresponding reader application of the mobile device 704.) The read operation may be initiated, for example, by tapping the contactless card 702 on the reader of the mobile device 704. In accordance to some embodiments, the initial URL request may be re-directed (e.g. as indicated by request/response communication 714) to a destination server, such as the authentication server 708, that may be hosting the image data file. This is illustrated by the communication 716 between the mobile device 704 and the re-directed destination (e.g. authentication server 708) for the acquisition of the raw image data to be processed on the user mobile device 704.

The raw image data retrieved from the hosting server (e.g., authentication server 708 may then be rendered by a client browser application running on the mobile device to generate rendered image data as indicated by operation 717. The content of a framebuffer associated with the output of the image rendering process (e.g., mobile browser's WebGL process) may then be hashed by a cryptographic hash process (e.g., operation 718) to generated an image hash identifier that may server as a GPU-based device signature and/or fingerprint. The image hash identifier is transmitted (as indicated by the transmission 720) to the authentication server 708 for comparison with previously stored image hash identifiers associated with previous device authentication attempts using the mobile device 704.

Upon determining a successful match with one or more previous hash identifier during the verification process 722, the mobile device is verified by the authentication server 708. Following a successful verification of the mobile device 704 by the authentication server 708, a device authentication message 724 may be transmitted to an authentication requesting entity (e.g., merchant server 710) as a standalone device authentication response and/or as part of a multi-factor authentication supplemented with other encrypted user identification data, which may be stored on the contactless card 702 and transmitted to the authentication server for verification along with the device signature (e.g., image hash identifier 720).

Figure 8:
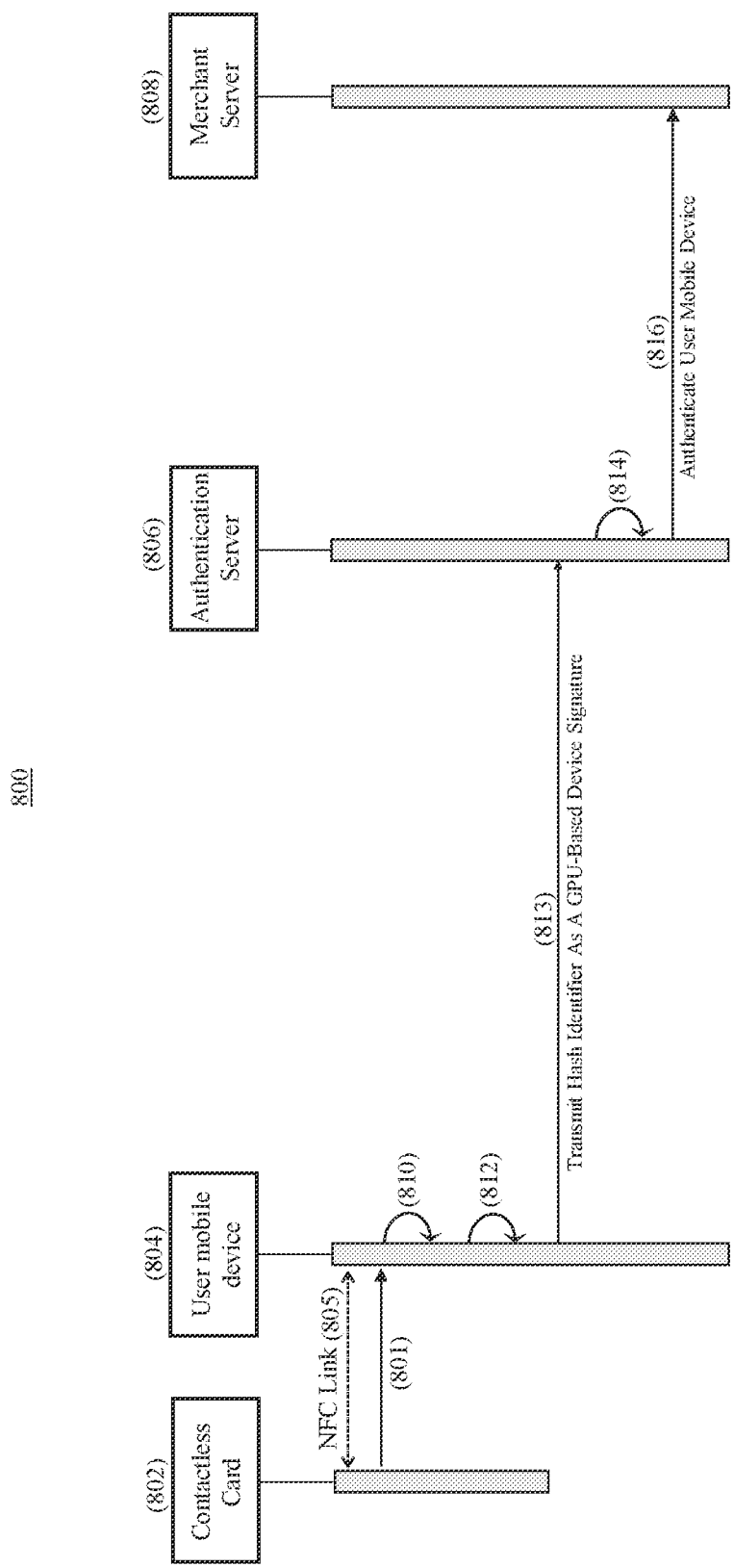
FIG. 8 illustrates a timing sequence diagram for a GPU-based device binding authentication, using raw image data stored on a contactless card, in accordance with exemplary embodiments of the present disclosure.

FIG. 8 illustrates a timing sequence associated with an exemplary GPU-based device verification process 800. The exemplary process 800 corresponds to a direct acquisition of an input image (e.g., raw image data from a contactless card 802), by a mobile device 804, via a NFC proximity link 805 established between the contactless card 802 and a user mobile device 804. The mobile device 804 may also be communicatively coupled to an authentication server 806. The raw image data retrieved directly from the contactless card 802 may then be rendered by a client browser application running on the mobile device 804 to generate a rendered image data as indicated by operation 810. The content of a framebuffer associated with the output of the image rendering process (e.g., mobile browser's WebGL process) may then be hashed by a cryptographic hash process (e.g., operation 812) to generated an image hash identifier that may server as a GPU-based device signature and/or fingerprint. The image hash identifier is transmitted (indicated by the transmission 813) to the authentication server 806 for comparison with previously stored image hash identifiers associated with previous device authentication attempts using the mobile device 804.

Upon determining a successful match with one or more previous hash identifier during the verification process 814, the mobile device is verified by the authentication server 806. Following a successful verification of the mobile device 804 by the authentication server 806, a device authentication message 816 may be transmitted to an authentication requesting entity (e.g., merchant server 808) as a standalone device authentication response and/or as part of a multi-factor authentication supplemented with other encrypted user identification data, which may be stored on the contactless card 802 and transmitted to the authentication server for verification along with the device signature (e.g., image hash identifier 813)

Figure 9:
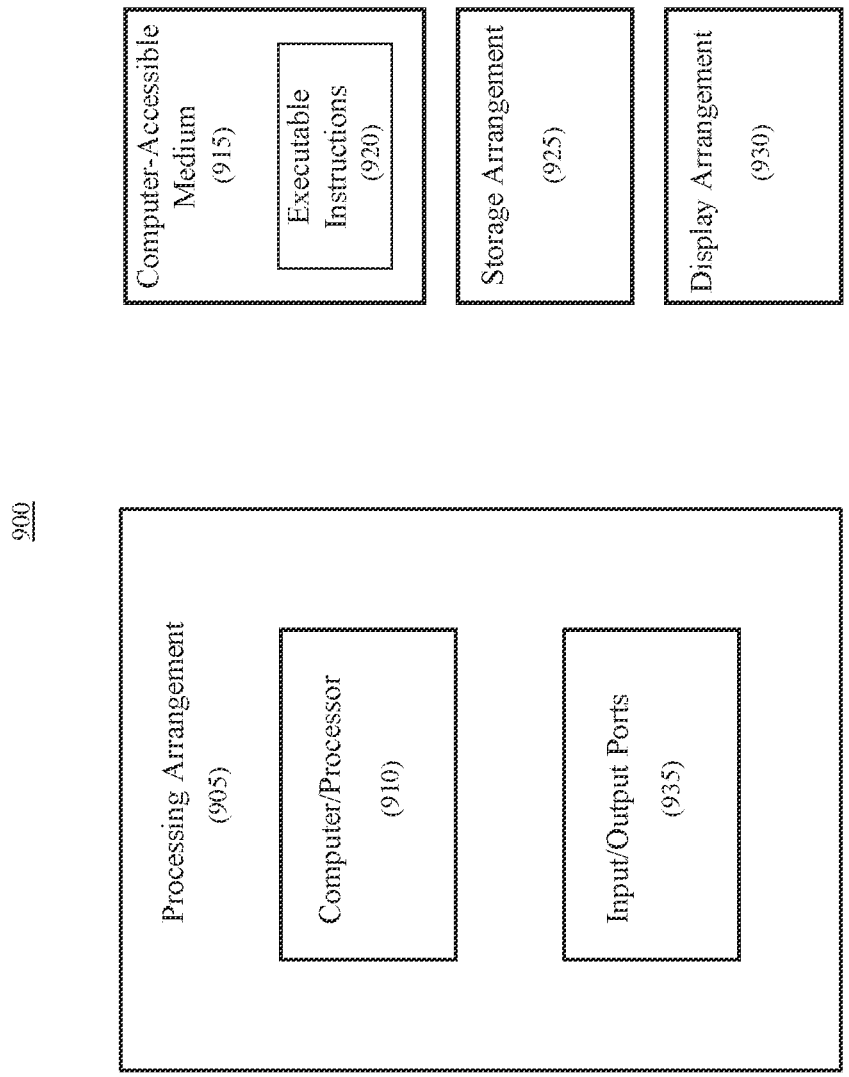
FIG. 9 illustrates a block diagram of an exemplary system, in accordance with exemplary embodiments of the present disclosure.

FIG. 9 shows a block diagram of an exemplary embodiment of a system according to the present disclosure. For example, exemplary procedures in accordance with the present disclosure described herein can be performed by a computer hardware arrangement 905. Such computer hardware arrangement 905 can be, for example entirely or a part of, or include, but not limited to, a computer and/or processor 910 that can include, for example one or more microprocessors, and use instructions stored on a computer-accessible medium (e.g., RAM, ROM, hard drive, or other storage device)

As shown in FIG. 9, for example a computer-accessible medium 915 (e.g., as described herein above), may comprise a storage device such as a hard disk, floppy disk, memory stick, CD-ROM, RAM, ROM, etc., or a collection thereof can be provided (e.g., in communication with the computer hardware arrangement 905.) The computer-accessible medium 915 can contain executable instructions 920 thereon. In addition or alternatively, a storage arrangement 925 can be provided separately from the computer-accessible medium 915, which can provide the instructions to the processing arrangement 905. The instructions can configure the computer hardware arrangement to execute the exemplary procedures, processes, and methods, as described herein above, for example.

Further, the exemplary computer hardware arrangement 905 can be provided with or include an input/output ports 935, which can include, for example a wired network, a wireless network, the internet, an intranet, a data collection probe, a sensor, etc. As shown in FIG. 9, the exemplary computer hardware arrangement 905 can be in communication with an exemplary display arrangement 930, which, according to certain exemplary embodiments of the present disclosure, can be a touch-screen configured for inputting information to the processing arrangement in addition to outputting information from the processing arrangement, for example. Further, the exemplary display arrangement 930 and/or a storage arrangement 925 can be used to display and/or store data in a user-accessible format and/or user-readable format.

As used herein, the term "card" is not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, membership cards, transportation cards, access cards), to cards associated with a particular type of account (e.g., a credit account, a debit account, a membership account), or to cards issued by a particular entity (e.g., a commercial entity, a financial institution, a government entity, a social club.) Instead, it is understood that the present disclosure includes cards having any purpose, account association, or issuing entity.

Systems and methods described herein can provide secure, retrieval of sensitive user information or enabling streamlined communication and processing of sensitive user information for example, for facilitating secure electronic transactions. Once a valid authorization response from an authenticated device and/or user has been established, the automated data retrieval and transfer system and process can permit, without limitation, financial transactions (e.g., credit card and debit card transactions), account management transactions (e.g., card refresh, card replacement, and new card addition transactions), membership transactions (e.g., joining and departing transactions), point of access transactions (e.g., building access and secure storage access transactions), transportation transactions (e.g., ticketing and boarding transactions, and other transactions.)

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), and any type of tangible and non-transitory storage medium, where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc. separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. An apparatus, comprising:
    A method for enhancing one time password (OTP) card authentication with GPU-based device binding, the method comprising:
    receiving an authentication message, via a near field communication (NFC) transmission, by a mobile device from a contactless card, the authentication message, corresponding to a user authentication request, being operative to provide raw image data associated with an image, to a mobile browser running on the mobile device;
    rendering, by the mobile browser, the image associated with raw image data, using a web graphics library (WebGL) application programming interface (API);
    generating an image hash identifier, from rendered image data generated by the mobile browser, using the WebGL API, the image hash identifier corresponding to the user authentication request;
    mapping the image hash identifier with a graphics processing unit (GPU) associated with the mobile device, for binding the mobile device to the authentication message provided by the NFC transmission from the contactless card;
    comparing, by an authentication server, the image hash identifier received from the mobile device, to one or more previously stored hash identifiers associated with one or more previous user authentication requests; and
    verifying, by the authentication server, the mobile device based on determining a match between the image hash identifier received from the mobile device in response to the user authentication request, and the one or more previously stored hash identifiers associated with the one or more previous user authentication requests.

2. The method of claim 1, wherein the authentication message comprise a uniform resource locator (URL) pointing to the image, the image being hosted on a web server, and the mobile device, responsive to receiving the URL, being operative to retrieve raw image data from the web server.

3. The method of claim 2, wherein raw image data associated with the image is retrieved from the web server through a URL redirection.

4. The method of claim 3, wherein the URL comprises embedded instructions for redirecting to multiple images to be periodically rotated, the multiple images being stored on the web server.

5. The method of claim 4, wherein the multiple images are stored on one or more distinct web servers.

6. The method of claim 1, wherein raw image data is stored in a near field communication data exchange format (NDEF) file on the contactless card, the NDEF file further comprising an image identifier corresponding to a multipurpose internet mail extensions (MIME) media type of the image for facilitating the rendering of the image by the mobile browser WebGL API.

7. The method of claim 6, wherein the NDEF file is transmitted to the mobile device for rendering, via the NFC transmission from the contactless card.

8. The method of claim 6, wherein raw image data associated with the image is directly read from the contactless card by a web server via web near field communication (WebNFC) and transmitted to the mobile browser on the mobile device for rendering.

9. The method of claim 1, wherein a transmission of the authentication message is initiated by conducting an NFC read of the contactless card by a NFC reader application, running on the mobile device.

10. The method of claim 1, wherein, raw image data comprises a high entropy pattern to exaggerate GPU differences in generating rendered image data.

11. The method of claim 1, wherein the image is rendered by the mobile browser in a fixed size frame buffer to prevent changes in rendered image data resulting from different screen resolutions.

12. A multi-factor authentication system based on integrating device binding functionality with one time password (OTP) authentication card, the system comprising a computer hardware arrangement configured to:
    provide a first image data associated with an image, to a mobile browser running on a mobile device of a user, the first image data received, as part of an authentication message, in response to a user authentication request, from a contactless card associated with the user; render the image from the first image data using a web graphics library (WebGL) functionality associated with the mobile browser, to generated a second image data; generate an image hash identifier from the second image data; map the image hash identifier with a graphics processing unit (GPU) associated with the mobile device to bind the mobile device with the authentication message transmitted from the contactless card; compare, by an authentication server, the image hash identifier received from the mobile device, to one or more previously stored hash identifiers associated with one or more previous user authentication requests; verify, by the authentication server, the mobile device based on determining a match between the image hash identifier received from the mobile device in response to the user authentication request and the one or more previously stored hash identifiers associated with one or more previous user authentication requests.

13. The system of claim 12, wherein the system is further configured to encode, into the authentication message, a uniform resource locator (URL) pointing to an image hosted on a web server, the URL directing the mobile browser to retrieve the first image data from the web server.

14. The system of claim 13, wherein the URL comprises embedded instructions for redirecting to multiple images to be periodically rotated, the multiple images being stored on the web server.

15. The system of claim 12, wherein the first image data is stored on the contactless card and transmitted to the mobile device, for rendering, via a near field communication (NFC) transmission from the contactless card, the NFC transmission further comprising an image identifier corresponding to a multipurpose internet mail extensions (MIME) media type of the image, to facilitate the rendering of the image by the WebGL functionality of the mobile browser.

16. The system of claim 12, wherein, the first image data corresponds to raw image data having a high entropy pattern to exaggerate GPU differences in generating the second image data, the second image data corresponding to rendered image data.

17. A non-transitory computer-accessible medium comprising instructions for execution by a computer hardware arrangement, wherein, upon execution of the instructions the computer hardware arrangement is configured to perform procedures comprising:
receiving an authentication message, via a near field communication (NFC) transmission, by a mobile device from a contactless card, the authentication message, corresponding to a user authentication request, being operative to provide a raw image data associated with an image, to a mobile browser running on the mobile device;
rendering, by the mobile browser, the image associated with the raw image data, using a web graphics library (WebGL) application programming interface (API);
generating an image hash identifier from a rendered image data generated by the mobile browser using the WebGL API, the image hash identifier corresponding to the user authentication request;
mapping the image hash identifier with a graphics processing unit (GPU) associated with the mobile device to provide binding between the mobile device and the authentication message provided by the NFC transmission from the contactless card;
comparing, by an authentication server, the image hash identifier received from the mobile device, to one or more previously stored hash identifiers associated with one or more previous user authentication requests; and
verifying, by the authentication server, the mobile device based on determining a match between the image hash identifier received from the mobile device in response to the user authentication request and the one or more previously stored hash identifiers associated with one or more previous user authentication requests.

18. The non-transitory computer-accessible medium of claim 17, further comprising instructions for encoding, into the authentication message, a uniform resource locator (URL) pointing to an image hosted on a web server, the URL directing the mobile browser to retrieve the raw image data from the web server.

19. The non-transitory computer-accessible medium of claim 17 further comprising instructions for redirecting to multiple images to be periodically rotated.

20. The non-transitory computer-accessible medium of claim 17, further comprising instructions for rendering the image directly from the NFC transmission received from the contactless card, the NFC transmission comprising raw image data and a multipurpose internet mail extensions (MIME) media type associated with the image, and stored on the contactless card.

* * * * *

UNITED STATES PATENT AND TRADEMARK OFFICE
CERTIFICATE OF CORRECTION

PATENT NO. : 12,335,256 B2
APPLICATION NO. : 18/118987
DATED : June 17, 2025
INVENTOR(S) : Jeffrey Rule et al.

It is certified that error appears in the above-identified patent and that said Letters Patent is hereby corrected as shown below:

On the Title Page

Please replace the abstract Item (57) as follows:
--The disclosed systems and methods are directed to generating a GPU-based mobile device signature to enhance the strength of an OTP card authentication signal. The proposed implementation leverages the NFC read capability of contactless OTP cards and WebGL image rendering functionality of mobile browser. An image, or a URL pointing to one, is received, via NFC transmission from a contactless card, for processing by a mobile browser. The output of the mobile browser image processing buffer can then be hashed and used as a device identifier for the specific mobile device performing electronic authentication of a transmission source by verifying, with high degree of certainty, the identity of the reading mobile device.--

Signed and Sealed this
Second Day of September, 2025

Coke Morgan Stewart
*Acting Director of the United States Patent and Trademark Office*